US006196530B1

(12) United States Patent
Muhr et al.

(10) Patent No.: US 6,196,530 B1
(45) Date of Patent: Mar. 6, 2001

(54) METHOD OF MANUFACTURING STABILIZER FOR MOTOR VEHICLES

(75) Inventors: Thomas Muhr, Attendorn; Leo Schnaubelt, Halger, both of (DE)

(73) Assignee: Muhr und Bender, Attendorn (DE)

( * ) Notice: Subject to any disclaimer, the term of this patent is extended or adjusted under 35 U.S.C. 154(b) by 0 days.

(21) Appl. No.: 09/075,838

(22) Filed: May 12, 1998

(30) Foreign Application Priority Data

| May 12, 1997 | (DE) | 197 19 427 |
| Oct. 8, 1997 | (DE) | 197 44 324 |
| Dec. 31, 1997 | (DE) | 197 58 292 |

(51) Int. Cl.$^7$ .......................... B60G 21/055; F16F 1/14; C23C 8/22
(52) U.S. Cl. .......................... 267/273; 72/369; 72/367.1; 148/316; 267/188; 267/154; 29/527.1
(58) Field of Search .................. 267/273, 154, 267/188, 277; 280/124.166, 124.167, 124.128; 72/367.1, 368, 369, 217, 307, 388, 133; 29/527.1; 148/537, 320, 572, 319, 316, 520, 570

(56) References Cited

U.S. PATENT DOCUMENTS

| 3,540,714 | * | 11/1970 | Mueller | 267/154 |
| 4,138,141 | * | 2/1979 | Andersen | 267/273 |
| 4,378,122 | * | 3/1983 | Ohno et al. | 267/273 |
| 4,469,349 | * | 9/1984 | Tomita et al. | 267/273 |
| 4,526,628 | * | 7/1985 | Ohno et al. | 148/520 |
| 4,841,760 | * | 6/1989 | Ferguson | 72/369 |
| 5,085,713 | * | 2/1992 | Morishita et al. | |
| 5,103,666 | * | 4/1992 | Schroeder | 72/369 |
| 5,598,735 | * | 2/1997 | Saito et al. | |
| 5,810,338 | * | 9/1998 | Koenig et al. | 267/154 |

FOREIGN PATENT DOCUMENTS

| 28 05 007 | | 8/1979 | (DE) . |
| 3730338 | * | 3/1989 | (DE) . |
| 0878334 | * | 11/1998 | (EP) . |
| 6346913 | * | 2/1988 | (JP) | 267/273 |
| 10324137 | * | 12/1998 | (JP) . |
| 9210375 | * | 6/1992 | (WO) | 267/273 |

* cited by examiner

Primary Examiner—Douglas C. Butler
(74) Attorney, Agent, or Firm—Nixon Peabody LLP; David S. Safran

(57) ABSTRACT

Stabilizer (1) for motor vehicles which has a toroidal cross section, and which is formed of several stabilizer sections that, together, create a U-shape having a pair of U-legs (2) connected by a U-back (3) via arcuately shaped transitional shoulder areas (4). The stabilizer (1), as a pipe stabilizer, is able to withstand the required number of load cycles even under very high stress or enables even greater weight reduction under normal stresses, by important stabilizer sections having an increased strength as compared to other stabilizer sections by either dimensioning, and/or increasing the carbon content of an outer and/or inner surface layer of the stabilizer (1) by carburization, and also, optionally, by at least partially shot peening the inner surface, preferably at least in the transitional shoulder areas (4).

7 Claims, 1 Drawing Sheet

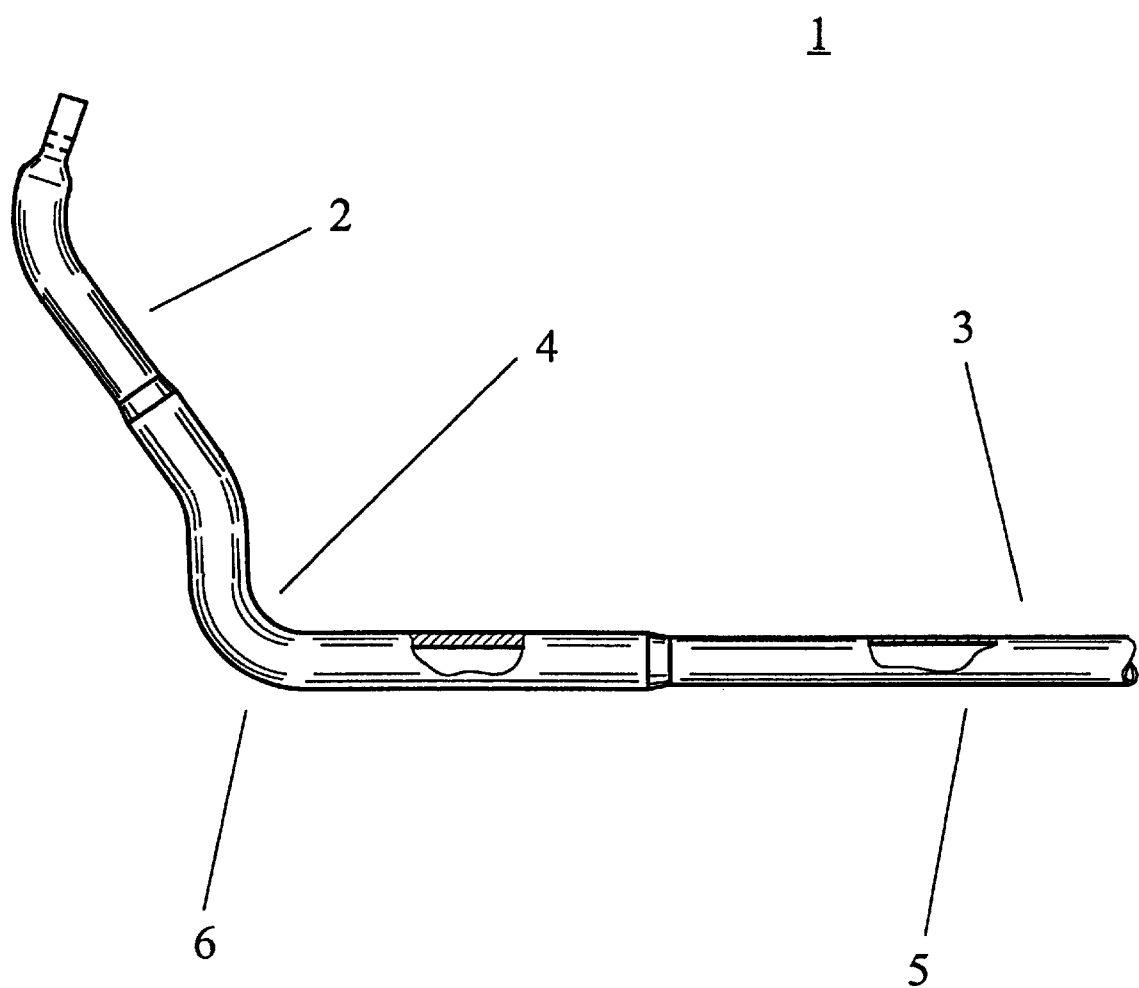

METHOD OF MANUFACTURING STABILIZER FOR MOTOR VEHICLES

BACKGROUND OF THE INVENTION

1. Field of the Invention

The invention relates to a stabilizer for motor vehicles which has a roughly round, preferably spherical, or annular, preferably toroidal, cross section, which has several stabilizer sections and which is made essentially U-shaped, having two legs connected by a U-back with arc-shaped transitional shoulder areas.

2. Description of Related Art

Stabilizers of the initially described type are essentially known, for example, from published German Patent Application OS 28 05 007. Such stabilizers are used on the front and/or rear axles of motor vehicles, and are used mainly to reduce the roll angle of motor vehicles when driving on curves. U-shaped stabilizers are attached with the free ends of the U-legs to the wheel guide parts, while in the shoulder area they are supported in rubber bearings located on the vehicle superstructure. For "weight reduction," which in general is becoming more and more critical, stabilizers with a circular cross section have come into increasing use; therefore, stabilizers produced from pipes, i.e., so-called pipe stabilizers.

Since, at this point, the stress is greater in pipes than in comparable solid bars ($D_a$ solid bar<$D_a$ pipe), under high load they do not reach the required number of load cycles or they can be used for a given number of load cycles only for smaller loads.

Published German Patent Application OS 28 05 007 describes a stabilizer formed of a pipe bent in a U-shape. Here, the required number of load cycles at a given stress will be achieved by the stresses being the same in all stabilizer sections. They are therefore stabilizers with the same stress in all stabilizer sections.

In cases of very high stress, in the past, effective weight reduction in stabilizers was not possible or the stabilizers could not withstand the required number of load cycles.

SUMMARY OF THE INVENTION

A primary object of the present invention is to provide a stabilizer, especially a pipe stabilizer, which withstand the required number of load cycles even under very high stress, or which enable even high weight reduction under normal stresses.

According to the first teaching of the invention, the aforementioned object is achieved by the individual stabilizer sections being dimensioned such that vibrational strength is optimized in the important stabilizer sections, in contrast to a stabilizer of uniform stress. Here, in the ideal case, the important stabilizer sections have quasi-uniform vibrational strength; but, due to restrictions (limits of diameter and stiffness), this object cannot always be achieved, for which optimization must always be done in the direction of the ideal case.

Optimization takes place by shifting the mechanical deformation work from the highly stressed shoulder arc or shoulder bearing area into the normally less stressed U-back and selectively also into the less stressed areas of the legs. This is done by reinforcing the shoulder arc or shoulder bearing area, therefore, by increasing the outside diameter $D_a$, and if necessary, the wall thickness t, thus increasing the spring rate, and at the same time, by weakening the U-back and selectively additional areas of the legs, thereby reducing the outside diameter $D_a$ and possibly wall thickness t, causing the spring rate to drop there.

In the individual stabilizer segments, the base cross sections (before forming the stabilizers) are preferably constant with the corresponding transitions from one to the other stabilizer section, for reasons of production engineering and economy.

The change of cross sections in the individual stabilizer sections is selected such that the total spring rate corresponds to a comparable solid or pipe stabilizer with cross sections which are quasi-uniform over the entire stabilizer length.

By fixing individual areas with different, preferably constant cross sections, between the individual areas, and in the individual areas themselves, there are different stresses with peaks and valleys, so that there is no stabilizer with the same stress in all stabilizer sections.

It is important to mention that, in the U-back which accommodates more deformation work, the stress can be raised by up to 32% (reference=solid bar constant) or 17% (reference=pipe constant) in order to achieve, in the unloaded shoulder arc or shoulder bearing area, stress reductions of up to 12% (reference=solid bar constant) or 20% (reference=pipe constant).

In the prior art, attempts have been made to increase the service life or allowable stress of the stabilizer by reinforcing the most highly stressed stabilizer sections in different ways. In the stabilizer of the invention, however, the service life or allowable stress is significantly increased by the mechanical deformation work being displaced from the highly stressed shoulder arc or shoulder bearing area into the normally less stressed U-back by making the U-back "softer."

The area in the U-back which accommodates more deformation work is preferably made with a smaller outside diameter than the transition areas. Thus, the U-back of the stabilizer of the invention is "softer" than the U-back of the known stabilizers; thus, it contributes much more to total deformation under operating load. The configuration of the stabilizer with an outside diameter reduced in the area of the U-back can be accomplished very easily in terms of production engineering, for example, by the corresponding tempering of the bar or pipe used for the stabilizer before or even after bending.

Alternatively the wall thickness of the stabilizer can be reduced in the area of the U-back. In addition, a combination of small outside diameter and reduced wall thickness of the stabilizer in the area of the U-back is possible to further reduce the weight.

According to a second teaching of the invention, the underlying object is achieved by increasing the strength by carburization of the outer and/or inner surface edge area of the stabilizer, especially in conjunction with an annealing process. In this case, carburization can take place both before the annealing process, then preferably also before tempering and forming the stabilizer, and also simultaneously with the annealing process.

Within the stabilizer production process, the carbon content of the material of the surface edge layer drops. Since the carbon content has an effect on the tensile strength of the material, reducing the carbon content in the especially stressed surface edge layer of the stabilizer reduces its vibrational strength. Therefore, carburization increases the tensile strength of the surface edge area of the stabilizer, and thus, the number of attainable load cycles is likewise increased. This effect is especially increased by annealing.

At high basic strength values, for example 1500–1800 MPa, increases of 10–50%, relative to basic strength, can be achieved in the carburized surface edge layer. In this way, the allowable stress or vibrational strength can be clearly increased.

Carburization increases the carbon content of the surface edge layer of the stabilizer, preferably, to such a degree that it is higher in the surface edge layer than within the stabilizer. In this way, the tensile strength is increased overall in the especially stressed surface edge layer of the stabilizer, as is the service life.

If the stabilizer in accordance with the invention is a pipe stabilizer, the allowable higher stress in the area of the U-back can be used to reduce the wall thickness in the area of the U-back. Here, the outside diameter over the entire length of the stabilizer can be constant or have a different value in the area of the U-back. By the possibility of changing both the inside diameter and outside diameter of the stabilizer in order to exploit the allowable higher stress in the area of the U-back, there are no problems in adhering to the outside dimensions of the stabilizer set by the motor vehicle manufacturer.

If the outside diameter of the stabilizer of the invention changes, this change can be made either sudden or continuous, both in the solid stabilizer and the pipe stabilizer. The corresponding also applies to the change of wall thickness in the pipe stabilizer; therefore, the change of the inside diameter alone or in combination with the outside diameter change can be made either sudden or continuous in either type of stabilizer.

Of course, the improvement of the surface edge layer by carburization, preferably in conjunction with annealing, is not limited to stability, but can also be used in other vibration-stressed steel components, for example, springs.

Finally, it can be especially advantageous to treat the inner surface by shot peening, and thus, to increase the inherent compressive strains in a stabilizer in accordance with the invention made as a pipe stabilizer. Of course, other known methods can be used to produce inherent compressive strains. Also, because inherent compressive strains can be produced, for example, by shot peening, the number of allowable load cycles can be increased, under certain circumstances even dramatically.

In particular, there are various possibilities for developing the stabilizer according to the invention as will become apparent from the following description of one preferred embodiment in conjunction with the drawings.

BRIEF DESCRIPTION OF THE DRAWINGS

The sole figure shows half of a stabilizer as claimed in the invention, in this case a pipe stabilizer.

DETAILED DESCRIPTION OF THE PREFERRED EMBODIMENT

The figure shows one half of mirror-symmetrical stabilizer 1, in this case a pipe stabilizer, which has a toroidal cross section and which is made essentially U-shaped, with one U-leg 2 and one-half of U-back 3. U-leg 2 and U-back 3 are joined to one another by arc-shaped transition area 4. This stabilizer 1 is attached using the free ends of U-legs 2 to the wheel guide parts of a motor vehicle not shown here. The free end of U-leg 2 shown is, in this case, attached to the corresponding wheel guide parts. The U-back 3 is supported on the vehicle superstructure in rubber bearings (not shown) and is located in the vicinity of transitional shoulder area 4.

In the preferred embodiment of stabilizer 1, the outside diameter of stabilizer 1 in torsional stress dominated stabilizer section 5, which is located in the area of the U-back 3, is smaller than in the normal stress dominated stabilizer section 6 which is located in transition area 4. In addition, the wall thickness of stabilizer 1 in the torsional stress dominated stabilizer section 5 is less than in the normal stress dominated stabilizer section 6. The described reduction of the outside diameter and the wall thickness is presupposed by the consideration of the fact that a "softer" U-back 3 accommodates greater mechanical deformation work than transition area 4, which more radically limits the allowable number of load cycles. The outside diameter and wall thickness of stabilizer 1 are changed continuously in the embodiment shown so that no edges arise which adversely affect the vibrational strength of stabilizer 1.

In the embodiment of stabilizer 1 shown, in accordance with the invention, carburization increases the carbon content of the outer surface edge layer of stabilizer 1 so far that it is higher on the surface edge layer, both on the inside and also on the outside, than within the stabilizer wall. Especially in conjunction with annealing, the tensile strength of the surface edge layer of the stabilizer can be increased by one half, preferably even by more than two thirds as compared to the tensile strength of a decarburized material.

At least in transition shoulder area 4, the inner surface of the stabilizer 1 is specially treated, specifically by shot peening. By this measure, the allowable number of load cycles can be increased even more by a factor of roughly four.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A method of manufacturing a pipe stabilizer for motor vehicles comprising the steps of:

forming said stabilizer from a single pipe composed of a metallic material;

providing said stabilizer with a single back section connected with a pair of legs sections by arcuate shoulder sections integrally extending from opposing ends of said back section;

comprising the step of mechanical deformation working said back section to soften it while leaving said shoulder sections free of mechanical deformation work.

2. A method as recited in claim 1, further comprising the step of strengthening said stabilizer by carburizing an outer surface of said stabilizer to increase the carbon content of said outer surface of said stabilizer relative to an inner surface of the stabilizer.

3. A method as recited in claim 1, further comprising the step of strenghtening said stabilizer by shot peening at least an inner surface of said stabilizer.

4. A method as recited in claim 1, further comprising the step of increasing the strength of said stabilizer by annealing.

5. A method as recited in claim 1, wherein the step of mechanical deformation softening is performed by reducing at least one of an outer diameter and wall thickness of the back section relative to an outer diameter and wall thickness of said arcuate shoulder sections.

6. A method as recited in claim 1, wherein the step of mechanical deformation softening is performed by reducing an outer diameter of the back section relative to an outer diameter of said arcuate shoulder sections.

7. A method as recited in claim 1, wherein the step of mechanical deformation softening is performed by reducing a wall thickness of the back section; relative to a wall thickness of said arcuate shoulder sections.

* * * * *